United States Patent [19]

Eversdijk et al.

[11] 4,257,785
[45] Mar. 24, 1981

[54] METHOD AND APPARATUS FOR SCRUBBING A GAS CONTAINING POWDERED PARTICLES

[75] Inventors: Bastiaan P. Eversdijk; Gerrit G. Kamphuts, both of Gorredijk, Netherlands

[73] Assignee: Stork Friesland B.V., Netherlands

[21] Appl. No.: 52,817

[22] Filed: Jun. 27, 1979

[51] Int. Cl.³ .......................... B01D 45/10; A23B 4/04
[52] U.S. Cl. ............................................. 55/89; 55/92; 55/238; 55/242; 55/385 R; 55/431; 261/79 A; 426/471
[58] Field of Search ..................... 55/89, 92, 238, 242, 55/385 R, 431, 459 R, 459 A, 459 B, 235–237; 261/79 A; 426/471; 159/4 R

[56] References Cited

U.S. PATENT DOCUMENTS

| 793,110 | 6/1905 | Uehling | 55/238 |
|---|---|---|---|
| 1,264,263 | 4/1918 | Brassert | 261/79 A |
| 2,351,864 | 6/1944 | Linderman, Jr. | 261/79 A |
| 2,807,450 | 9/1957 | Gordon | 55/238 |
| 3,186,146 | 6/1965 | Latham, Jr. | 55/238 |
| 3,212,235 | 10/1965 | Markant | 55/238 |
| 3,771,289 | 11/1973 | Skoli et al. | 55/238 |
| 3,984,220 | 10/1976 | Curchod | 261/79 A |
| 4,005,998 | 2/1977 | Gorman | 55/242 |
| 4,067,706 | 1/1978 | Georgopapadakos et al. | 55/242 |

FOREIGN PATENT DOCUMENTS

| 2743724 | 4/1978 | Fed. Rep. of Germany | 426/471 |
|---|---|---|---|
| 465147 | 8/1951 | Italy | 55/431 |

*Primary Examiner*—David L. Lacy
*Attorney, Agent, or Firm*—Ostrolenk, Faber, Gerb & Soffen

[57] ABSTRACT

A scrubber for separating powder particles from a gas stream comprising a closed vertical cylindrical housing having a tangential inlet for the gas stream and a concentric discharge pipe passing through the top of the housing for the removal of the purified gas stream; in which means are provided for flushing the lower portion of the inner wall of the housing. The flushing means comprises an annular gutter surrounding the housing and communicating with said inner wall by means of a large number of narrow passages. The level of the gutter is well above the lower end of the discharge pipe.

6 Claims, 4 Drawing Figures

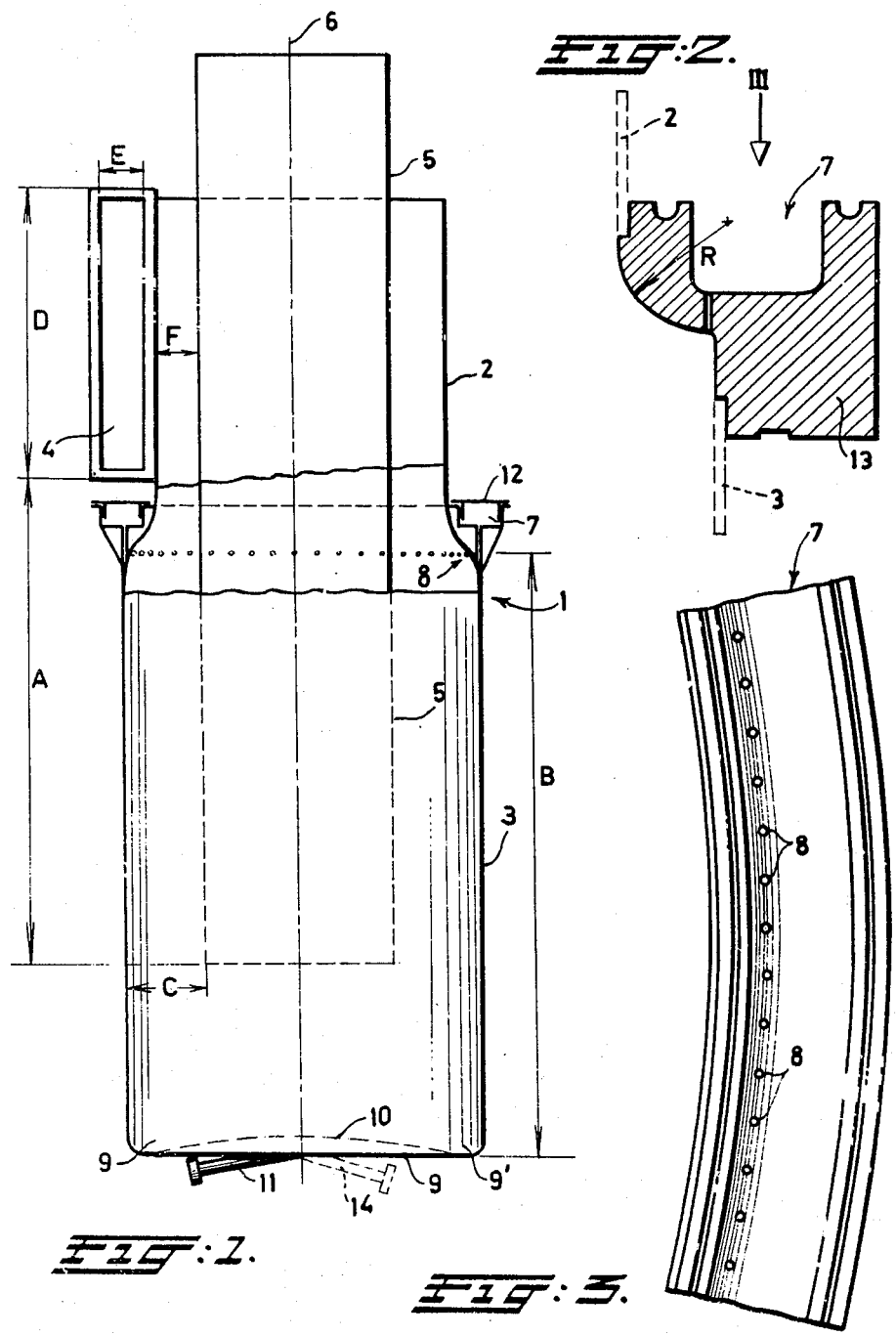

METHOD AND APPARATUS FOR SCRUBBING A GAS CONTAINING POWDERED PARTICLES

BACKGROUND OF THE INVENTION

The invention relates to apparatus for removing pulverized particles or other type of particles carried along in a stream of gas, comprising a substantially cylindrical housing having a first portion provided with a tangentially directed inlet for the stream of gas to be purified, means for flushing the inner wall of the housing located in an annular zone which extends tranversely of the centerline of the housing and means for permitting the gas stream to exit. The housing is also provided with an eduction pipe which exits outside the housing in such a manner that the stream of gas to be purified flows through an axial track inside the housing. A similar scrubber in a particular embodiment is shown from U.S. Pat. No. 2,696,275 according to which the stream of gas is injected into a number of cyclone paths via a stationary blade rim and then passes along a moistened inner wall, after which the scrubbed stream of gas is removed upward through the eduction pipe.

One problem which arises in scrubbers is that some wall portions inside the housing are moistened occasionally as a result of local turbulence, so that there is a precipitation or deposit of the particles present or of the dissolved material. These deposits, also known as scruffs, may be the cause of pollution or of bacterial growth as a result of which the sanitary character of the scrubber is lost. The occurrence of such problems is particularly promoted by the turbulence of the stream of gas inside the housing.

SUMMARY OF THE INVENTION

It is the object of the invention to provide a scrubber which does not exhibit the disadvantages mentioned and which may come up to high demands from a sanitary point of view. According to the invention, this object is obtained in that the means for flushing are made up of an annular gutter which via a large number of outlets exits into a second portion of the housing which widens gradually within which portion the central eduction or outlet pipe extends.

For obtaining the lowest possible turbulent flow of the stream of gas, it is favorable if the transition between the inner wall of the first to the second portion of the housing runs so fluently that the stream of gas does not show an inclination toward disengaging or losing contact with the inner wall. As a result thereof, no air-turbulence and spatters of fluid will occur at the point of inlet of fluid owing to the gradual curve of the inner wall.

As a result of the above mentioned measures, the inner wall of the housing is efficiently flushed without the risk of leaving drops of fluid spraying away. The particles in the circulating stream of gas are urged outward in the direction of the flushed inner wall, and a sharp separation occurs between the dry inner wall in the first portion of the housing and the inner wall of the second portion of the housing which is kept wet by complete flushing.

In an embodiment of the scrubber according to the invention the flushing gutter forms part of an annular intermediate element merging with the two portions of the cylindrical housing. This embodiment simplifies the construction of the apparatus and in addition allows a certain thermal isolation of the gutter with respect to the inner wall of the housing to be brought about as a result of which unwanted condensation of fluid against the dry wall portion is prevented. In the flushing gutter fresh fluid is supplied continually as a result of which this fluid will circulate in the gutter.

The length of the central eduction or outlet pipe inside the second (flushed) portion of the housing is important in that it influences the percentage of catch of the particles from the stream of gas. In the scrubber according to the invention the central eduction pipe extends a distance past the annular flushing zone which is many times larger than the distance between the pipe and the inner wall of the second portion of the housing.

It is furthermore important that the tangentially directed supply for injecting the stream of gas takes place via a slit-shaped aperture with a height which is practically equal to the height of the first portion of the housing and with a width which is smaller than the distance between the central eduction pipe and the inner wall of the first housing portion. This contributes to the suppression of a turbulence and to the promotion of the transport of the particles to the inner wall of the housing. An extension of time that the stream of gas remains in the housing may be obtained by lengthening the central eduction pipe.

Another important measure for preventing bacterial growth may be found in a reduction of the temperature of the fluid collecting on the bottom. The method applied for this purpose relates to the operation of the scrubber described above which is connected with, for instance, an apparatus for spray-drying milk, in which a first portion of a flushing fluid is utilized for flushing a zone along the inner wall of the scrubber. According to the invention, a second portion of this fluid is supplied in a controlled way to the lower portion of the flushing zone for cooling purposes. This means that the bacterial growth is fought not only on the dry surface of the eduction pipe (with high temperature) but also on the wet surface by means of a low temperature. The foregoing and other objects and features of the invention will become apparent from the following description and accompanying drawings.

BRIEF DESCRIPTION OF THE DRAWINGS

FIG. 1 is a side-view with partial cross-section of the scrubber;

FIG. 2 is a cross-section on an enlarged scale of a variant of a detail of the apparatus according to FIG. 1;

FIG. 3 is a top-view according to the arrow III in FIG. 2;

DESCRIPTION OF A PREFERRED EMBODIMENT

Figure 4:
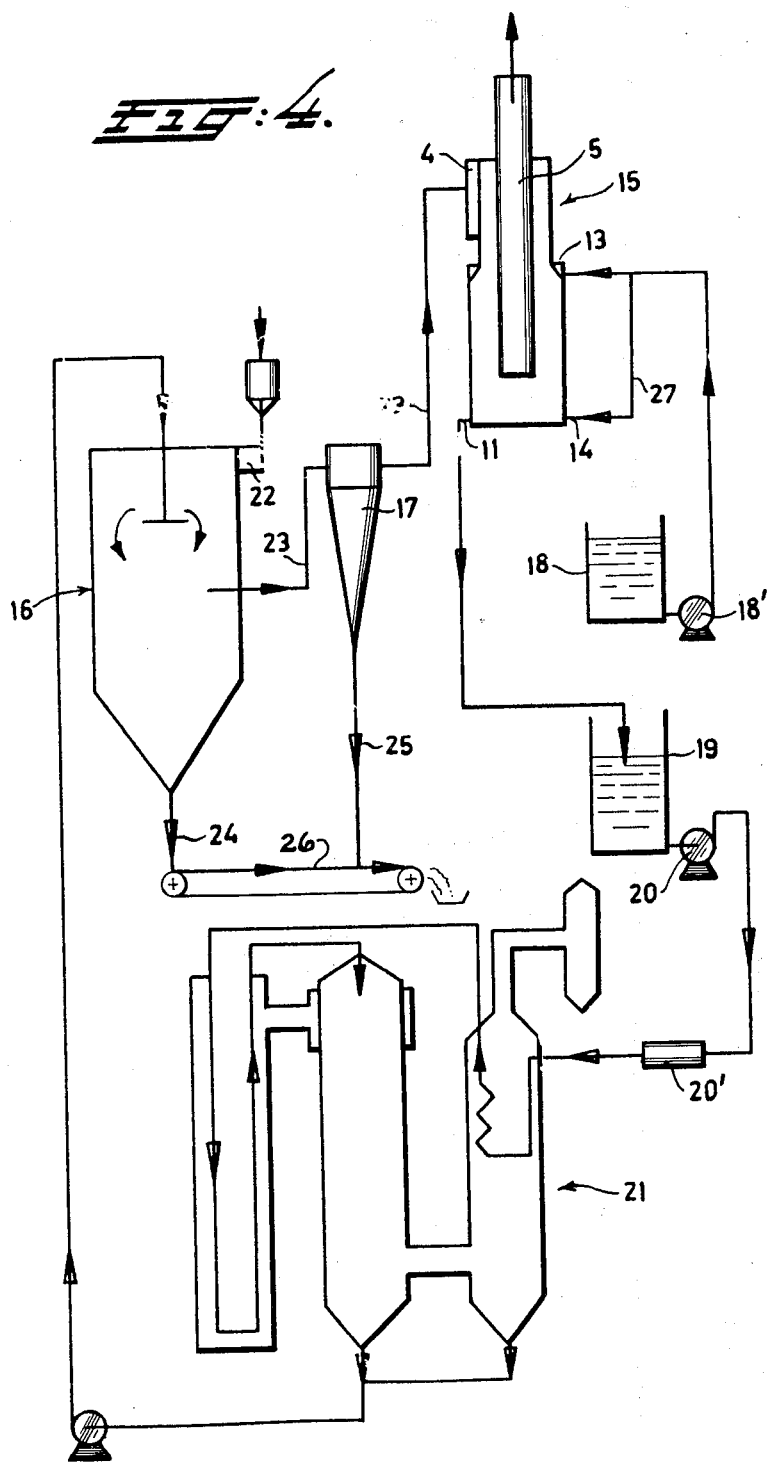
FIG. 4 shows schematically a complete apparatus.

As may be seen from FIG. 1, the apparatus comprises a substantially cylindrical housing 1 which includes a first (upper) portion 2 and a second (lower) portion 3 which is somewhat widened with respect to the portion 2. The first portion 2 of the housing 1 is provided with a tangentially directed inlet 4 for the stream of gas to be scrubbed. Inside the housing there is an eduction or outlet pipe 5 for the scrubbed gas; pipe 5 extends into the lower part of portion 3 of the housing and exits above the portion 2 of this housing. Between the inlet 4 and the bottom of the eduction or outlet pipe 5, there is an annular gas track A which is traversed by the stream of gas to be scrubbed. Next to and partly past this track A there is provided a flushing zone B. At the end located near the gas inlet 4, the flushing zone B is limited by means for flushing the inner wall of the housing. These means are located in an annular zone which stands transversely to the centerline 6 of the housing 1, and they comprise an annular gutter 7 which, via a large number of apertures 8 communicates with the widened second portion 3 of the housing 1, i.e. the beginning of the flushing zone B. At its other end the zone B is limited by the bottom 9 of the housing 1. The fluid in the bottom 9 is collected in an annular gutter 9' as a result of the inward curve 10. A discharge line 11 is connected with this gutter 9', while moreover there is provided a connection 14 hereafter explained.

As may be seen from FIG. 1, the transition between the inner wall of the first portion 2 of housing 1 to the second portion 3 of the housing 1 runs smoothly in such a way that the turbulence of the stream of gas is suppressed. In the embodiment illustrated, the passages 8 between the gutter 7 and the inner wall of the lower portion 3 of the housing are in the form of short flow sections that efficiently flushes the inner wall with moistening fluid without splashing. Such inner wall flushing means makes it possible that the outside of the eduction or outlet pipe 5 remains dry and that the inner wall of the lower portion 3 is continually moistened and will not show dry spots. The moistening fluid required for this purpose may be supplied to the gutter 7 in such a way that a circulating stream will occur which promotes a uniform flushing of the inner wall of the housing. The gutter 7 may be double-walled or be isolated in any other manner with respect to the upper portion 2 of the housing, so that local cooling of the inner wall is prevented and, in this manner, no condensation drops will precipitate from the stream of gas. On the top the gutter 7 is open and sealed by a lid 12. This allows the connections 8 to be reached from the outside for cleaning, if necessary.

The lid 12 allows the flushing gutter 7 to form a closed space so that the fluid may be supplied under some overpressure (the pump pressure). This may promote the stream through the passages 8.

The length of that portion of the gas eduction or outlet pipe 5 which is located inside the housing 1 and the distance C between this pipe and the inner wall of the second portion 3 of the housing 1 are important inasmuch as a little distance C increases the possibility that the particles entrained in the stream of gas will touch the inner wall, and a great length A ensures a sufficient stay. Preferably the distance A, in which the central eduction pipe 5 is located in the flushing zone B, will be many times greater than the said distance C (for instance ten times). It is also important that the tangentially directed supply of the stream of gas is effected via the slit-shaped aperture with a height D illustrated in FIG. 1, which height is practically equal to that of the first portion 2 of the housing. The width E of the supply 4 is preferably smaller than the distance F between the central eduction pipe 5 and the inner wall of the first portion 2 of the housing.

FIGS. 2 and 3 show a variant of the flushing means. The gutter 7 is therein part of an annular intermediate element 13 with which the two portions 2 and 3 of the cylindrical housing 1 are connected. FIG. 3 gives a picture of the number of connections 8 (in this case bores) between the gutter 7 and the inner wall of the portion 3. At a housing diameter of about 1700 mm, the radius of curvature R has a value of about 25 mm.

The fluid leaving at the outlet 11 is uncontaminated and may be conveyed back again to the foregoing evaporation or drying apparatus. It is observed that the dimensions of the passages or channels 8 with respect to the total amount of fluid supplied are such that the inner wall of the portion 3 of the housing remains wet completely down to the bottom 9 in order to prevent any beginning of precipitation or vegetation. The most important advantage of the scrubber according to the invention is that the particles emanating from a stream of gas from a drying apparatus may be caught without contamination because the inner wall of the housing 1 is flushed uninterruptedly in the flushing zone B.

The eduction or outlet pipe 5 remains dry as a result of the centrifugal action of the rotary stream of air by which a sharp separation between the wet and the dry portions of the scrubber is maintained. It is of vital importance that the eduction pipe 5 remains dry, because:

(a) no drops are carried on to the open air;

(b) no bacterial growth may occur in dry surfaces in any event if the temperature on the surface is sufficiently high (above 70° C.).

Any growth of bacteria in the wet portion B is prevented since the flushing is so high that the dwell of the fluid with respect to the time of generation in unwanted bacteria is so limited that no bacteria growth may occur. In this manner the interior of the housing 1 remains clean and a return of the fluid to an evaporating or drying plant is possible and the loss of valuable particles is limited. It may be observed that the invention is particularly intended to the processing of dairy products such as milk or whey.

In an embodiment, the following dimensions, amounts, temperatures and densities may occur:

| | |
|---|---|
| Diameter of the upper portion of the housing 1 | 1700 mm |
| Diameter of the portion 3 of the housing 1 | 1750 mm |
| Diameter of the eduction pipe 5 | 1100 mm |
| Length of the gas track A outside the pipe 5 | 3200 mm |
| Length of the flushing zone B | 4000 mm |
| Flushing fluid | milk |
| Velocity of the stream of gas via inlet 4 | 25 m/sec. |
| Amount of powdered milk by weight in this stream of gas | 210 mg/m$^3$ |
| Temperature of the stream of gas | 95° C. |
| Temperature of the fluid | 5–15° C. |
| Weight ratio gas/fluid | about 10 |
| Stay of the moistening fluid in the flushing zone B | about 10 sec. |
| Percentage of the fluid carried off via the bottom 9 with respect to the total amount supplied as a result of partial evaporation of the fluid film | 96% |

FIG. 4 shows a complete plant comprising a scrubber 15 with which on the one side a spray dryer 16 for condensed milk and a separating cyclone 17 are connected. On the other side, the scrubber 15 is connected, by means of the intermediate element 13, with a stock 18 of the moistening fluid (cool milk) via a pump 18'. The line 11 of the scrubber is connected with a tank 19. Via a pump 20 and possibly via an intermediate cooler 20' this tank is connected with an evaporating battery 21 in which the milk to be treated is condensed to a content of 50% of solids. This condensed product is carried to the above mentioned spray drier 16 which is provided with an inlet 22 for hot air and a gas outlet 23 which is connected with the inlet 4 of the scrubber 15 via the cyclone 17. Both the spray drier 16 and the cyclone 17 possess a powder outlets 24 and 25, respectively leading to a belt 26.

The moistening fluid supplied from the stock 18 to the gutter 7 will get warmer in the flushing zone B and obtain a temperature of, for instance, 40° C. This may promote bacteria growth. In order to maintain the sanitary properties of the scrubber 15, an additional line 27 is provided between the stock of fluid 18 and the connection 14 in the bottom of the scrubber. In this manner, mixing of the warm fluid from the zone B and the cooling fluid supplied from the stock 18 occurs. A mixing temperature of 15° C. may be obtained in this manner.

What is claimed is:

1. An apparatus for separating powder particles from a stream of gas, comprising a housing having a substantially vertical axis, said housing having an upper cylindrical portion provided with a tangentially directed inlet for a stream of gas and a wider lower cylindrical portion having a bottom; said lower cylindrical portion of said housing having a horizontal annular transitional zone comprising a smoothly curved, conical wall merging with the said two opposite portions of the housing, means for flushing the inner wall of said lower portion of said housing, said means being located in said horizontal annular transitional zone, said housing being further provided with a vertical discharge pipe extending centrally inside the housing from substantially the midpoint of said lower portion up through the upper portion and opening outside the housing, said flushing means comprising an annular gutter containing a moistening fluid with a plurality of passages extending through the conical wall to the transitional zone of the housing, and opening flush with the inner wall of said lower portion, to direct said fluid onto said inner wall.

2. Apparatus for removing powdered particles entrained in a stream of gas, comprising a substantially cylindrical housing having a relatively small diameter portion, a relatively large diameter portion and an intermediate portion interconnecting the small and large diameter portions with a gradual transition curvature, an outlet conduit extending axially through the housing having an inlet end within the large diameter portion and a discharge end externally of the housing, inlet means for tangentially introducing the stream of gas into the small diameter portion of the housing, said housing portions having internal wall surfaces radially spaced from the outlet conduit to form an axial flow passage conducting the gas from the inlet means to the inlet end of the outlet conduit in surrounding relation thereto, flushing means for moistening the internal wall surface of the large diameter portion of the housing within a flushing zone to the exclusion of the small diameter portion and the outlet conduit, including an annular gutter enclosing a moistening fluid and a plurality of passages directing the moistening fluid from the gutter internally into the housing and onto the internal wall surface of the large diameter portion, and means for draining the moistening fluid collected within the large diameter portion of the housing.

3. The apparatus as defined in claim 2, wherein the transition curvature is generally conical.

4. The apparatus as defined in claim 3 wherein said annular gutter is mounted on the intermediate portion of the housing.

5. The apparatus as defined in claim 2 including a source of cooling fluid and means conducting said cooling fluid from the source to the large diameter portion of the housing for mixing with the moistening fluid collected therein to cool the same.

6. In a method of scrubbing a gas for removal of powdered particles therefrom, wherein a wall surface within a flushing zone in contact with said gas, is flushed with a moistening fluid under a temperature lower than that of the gas supplied from a source externally of the flushing zone, and wherein said moistening fluid is collected within said zone after contact with the gas, the steps of:

dividing flow of the moistening fluid from the source into two flow paths at said lower temperature;

conducting the moistening fluid along one of said flow paths to the flushing zone within which the fluid is heated to a higher temperature by contact with the gas; and mixing the fluid conducted along the other of the flow paths under said lower temperature with the collected fluid within the zone for cooling thereof.

* * * * *